US011784324B2

(12) United States Patent
Okamura

(10) Patent No.: US 11,784,324 B2
(45) Date of Patent: Oct. 10, 2023

(54) SEPARATOR FOR FUEL CELL AND FUEL CELL STACK

(71) Applicant: HONDA MOTOR CO., LTD., Tokyo (JP)

(72) Inventor: Hidenori Okamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/587,019

(22) Filed: Jan. 28, 2022

(65) Prior Publication Data

US 2022/0246951 A1    Aug. 4, 2022

(30) Foreign Application Priority Data

Feb. 3, 2021 (JP) ................................. 2021-015618

(51) Int. Cl.
*H01M 8/0247* (2016.01)

(52) U.S. Cl.
CPC ...... *H01M 8/0247* (2013.01); *H01M 2250/20* (2013.01)

(58) Field of Classification Search
CPC ........... H01M 8/0247; H01M 2250/20; H01M 8/1004; H01M 8/2465; H01M 8/0202; H01M 8/247
See application file for complete search history.

(56) References Cited

U.S. PATENT DOCUMENTS 7,097,672 B2 *  8/2006  Takamura .......... H01M 8/0228
                                                    429/434
9,368,825 B2 *  6/2016  Yamano .............. H01M 8/2483

FOREIGN PATENT DOCUMENTS

| JP | 2004-055248 A | 2/2004 |
| JP | 2007-066573 A | 3/2007 |
| JP | 2010-118306 A | 5/2010 |
| JP | 2013-196849 A | 9/2013 |

OTHER PUBLICATIONS

Office Action dated Nov. 1, 2022 issued over the corresponding Japanese Patent Application No. 2021-015618 with the English translation thereof.

* cited by examiner

*Primary Examiner* — Stewart A Fraser
(74) *Attorney, Agent, or Firm* — Carrier, Shende & Associates P.C.; Joseph P. Carrier; Jeffrey T. Gedeon

(57) ABSTRACT

A separator for a fuel cell is overlapped with a membrane electrode assembly to form a stack unit of a power generation cell stack body. The separator is provided with a positioning section to be overlapped in the stacking direction in a manner that the stack units are positioned with respect to each other. A marginal portion of the positioning section has a bent surface formed by bending the separator.

8 Claims, 10 Drawing Sheets

SEPARATOR FOR FUEL CELL AND FUEL CELL STACK

CROSS-REFERENCE TO RELATED APPLICATIONS

This application is based upon and claims the benefit of priority from Japanese Patent Application No. 2021-015618 filed on Feb. 3, 2021, the contents of which are incorporated herein by reference.

BACKGROUND OF THE INVENTION

Field of the Invention

The present invention relates to a separator for a fuel cell and a fuel cell stack including the separator.

Description of the Related Art

In general, a fuel cell is used in the form of a fuel cell stack including a power generation cell stack body formed by staking a plurality of power generation cells (unit cells), and end plates provided at both ends of the power generation cell stack body in the stacking direction. The power generation cell is formed by sandwiching the membrane electrode assembly between a pair of separators. Some of the fuel cell stacks of this type adopt so called internal manifold structure for supplying fluid such as reactant gases to each of the membrane electrode assemblies of the power generation cell stack body. In such a case, in order to achieve suitable fluid seal performance, the stack units of the power generation cell stack body need to be stacked together in the state where the stack units are positioned highly accurately.

In this regard, for example, as disclosed in JP 2013-196849 A, it may be possible to provide positioning holes in stack units. A plurality of stack units are overlapped with each other in a stacking direction to position stack units with respect to each other at predetermined positions. By providing the positioning holes in this manner, for example, using an assembling apparatus provided with a knock pin protruding from a pedestal plate, it becomes possible to position the stack units with respect to each other easily. That is, the knock pin is inserted into the positioning holes in a manner that while the inner circumferential surface of each of the positioning holes moves along the outer circumferential surface of the knock pin, the plurality of stack units are stacked together on the pedestal plate. In this manner, the positioning holes are aligned in the stacking direction, and the plurality of stack units can be stacked together in the state where the plurality of stacked units are positioned with respect to each other.

SUMMARY OF THE INVENTION

In the case of stacking the stack units together as described above, there is a concern that the stack units are deformed due to the frictional force generated between the inner peripheral surface of the positioning hole and the outer peripheral surface of the knock pin. In the power generation cell stack body, it is necessary to maintain the adjacent cell separators in the state where the separators are electrically insulated from each other. Therefore, there is a demand to suppress deformation of, in particular, the separators in the stack unit. Thus, it is desired to position the stack units with respect to each other, and suppress deformation of the separators.

An object of the present invention is to solve the above described problem.

According to an aspect of the present invention, a separator for a fuel cell is provided. The separator is configured to be overlapped with a membrane electrode assembly to form a stack unit. The membrane electrode assembly includes an electrolyte membrane and electrodes provided on both surfaces of the electrolyte membrane. A plurality of stack units are stacked together in a stacking direction to form a power generation cell stack body. The separator is provided with a positioning section to be overlapped with each other in the stacking direction in a manner that the stack units are positioned with respect to each other. A marginal portion of the positioning section has a bent surface formed by bending the separator.

According to another aspect of the present invention, a fuel cell stack is provided. The fuel cell stack includes a power generation cell stack body formed by stacking a plurality of cell units together in a stacking direction. Each of the cell units is formed by overlapping a membrane electrode assembly and a separator together. The membrane electrode assembly includes an electrolyte membrane and electrodes provided on both surfaces of the electrolyte membrane. The separator is provided with a positioning section to be overlapped in the stacking direction in a manner that the stack units are positioned with respect to each other. A marginal portion of the positioning section has a bent surface formed by bending the separator.

The separator is provided with a positioning section where the stack units are overlapped with each other in the stacking direction in a manner that the stack units are positioned with respect to each other. For example, while a positioning section is being guided by the guide bar extending in the stacking direction, the plurality of stack units are stacked together. In this manner, it is possible to stack the positioning sections each other in the stacking direction. Therefore, in the state where the plurality of stack units are positioned with respect to each other, it is possible to stack the plurality of stack units together easily.

Further, a marginal portion of the positioning section has a bent surface formed by bending the separator. For example, the bent surface has a smooth shape having a small surface roughness, in comparison with the cutting surface (non-bent surface) formed by the cutting process, machining, etc. Therefore, because the positioning section having the marginal portion with the bent surface is guided by the guide bar, for example, in comparison with the case where the positioning section having the marginal portion with the above cutting surface is guided by the guide bar, it is possible to reduce the frictional force produced between the positioning section and the guide bar. As a result, it is possible to suppress deformation of the separator.

Therefore, in the present invention, it is possible to easily position the stack units with respect to each other, and suppress deformation of the separator.

The above and other objects, features and advantages of the present invention will become more apparent from the following description when taken in conjunction with the accompanying drawings in which preferred embodiments of the present invention are shown by way of illustrative example.

DESCRIPTION OF THE INVENTION

Figure 1:
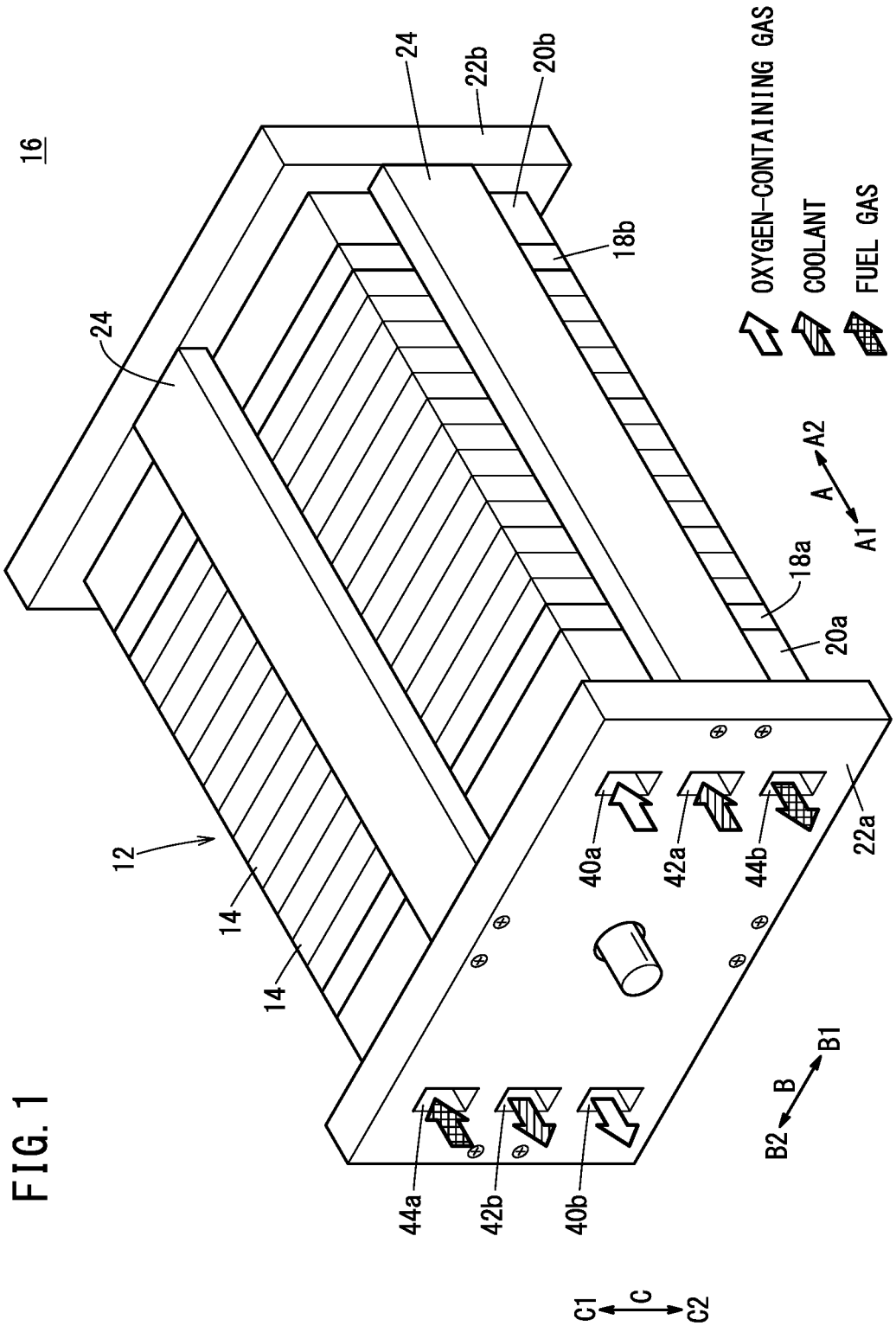
FIG. 1 is a perspective view showing a fuel cell stack according to an embodiment of the present invention.

In the drawings mentioned hereinafter, the constituent elements having the same or similar functions and advantages may be labeled with same reference numerals, and repeated description thereof may be omitted.

In use, a fuel cell stack 16 including a separator 28 for a fuel cell (FIG. 2) according to an embodiment of the present invention shown in FIG. 1 can be mounted in a fuel cell vehicle such as a fuel cell electric automobile (not shown). Further, the fuel cell stack 16 may be used in stationary applications. The fuel cell stack 16 includes a power generation cell stack body 12. The power generation cell stack body 12 is formed by stacking a plurality of power generation cells 14 in a stacking direction (direction indicated by an arrow A). At one end of the power generation cell stack body 12 in the stacking direction (end on the arrow A1 side), a terminal plate 18a is provided. An insulator 20a is provided outside the terminal plate 18a, and an end plate 22a is provided outside the insulator 20a. At the other end of the power generation cell stack body 12 in the stacking direction (end on the arrow A2 side), a terminal plate 18b is provided. An insulator 20b is provided outside the terminal plate 18b, and an end plate 22b is provided outside the insulator 20b.

Each of the insulators 20a, 20b is formed of insulating material. Examples of the insulating material include polycarbonate (PC), phenol resin, etc. It should be noted that each of the insulators 20a, 20b is made up of a plurality of (e.g., two) insulators stacked together in the stacking direction. Further, though not shown, a recess may be formed on a surface of each of the insulators 20a, 20b facing the power generation cell stack body 12. The recess is depressed in a direction away from the power generation cell stack body 12. The terminal plate 18a is disposed in the recess of the insulator 20a. The terminal plate 18b is provided in the recess of the insulator 20b.

As shown in FIG. 1, coupling bars 24 are disposed between the sides of the end plate 22a and the sides of the end plates 22b. One end of each of the coupling bars 24 is fixed to an inner surface of the end plate 22a using bolts, etc. The other end of each of the coupling bars 24 is fixed to an inner surface of the end plate 22b using bolts, etc. The coupling bars 24 are fixed to the end plates 22a, 22b, respectively, to apply a compression load (tightening load) to the power generation cell stack body 12 in the stacking direction. It should be noted that the fuel cell stack 16 may be provided with a casing including the end plates 22a, 22b. In this case, components such as the power generation cell stack body 12, etc. are accommodated in the casing.

Figure 2:
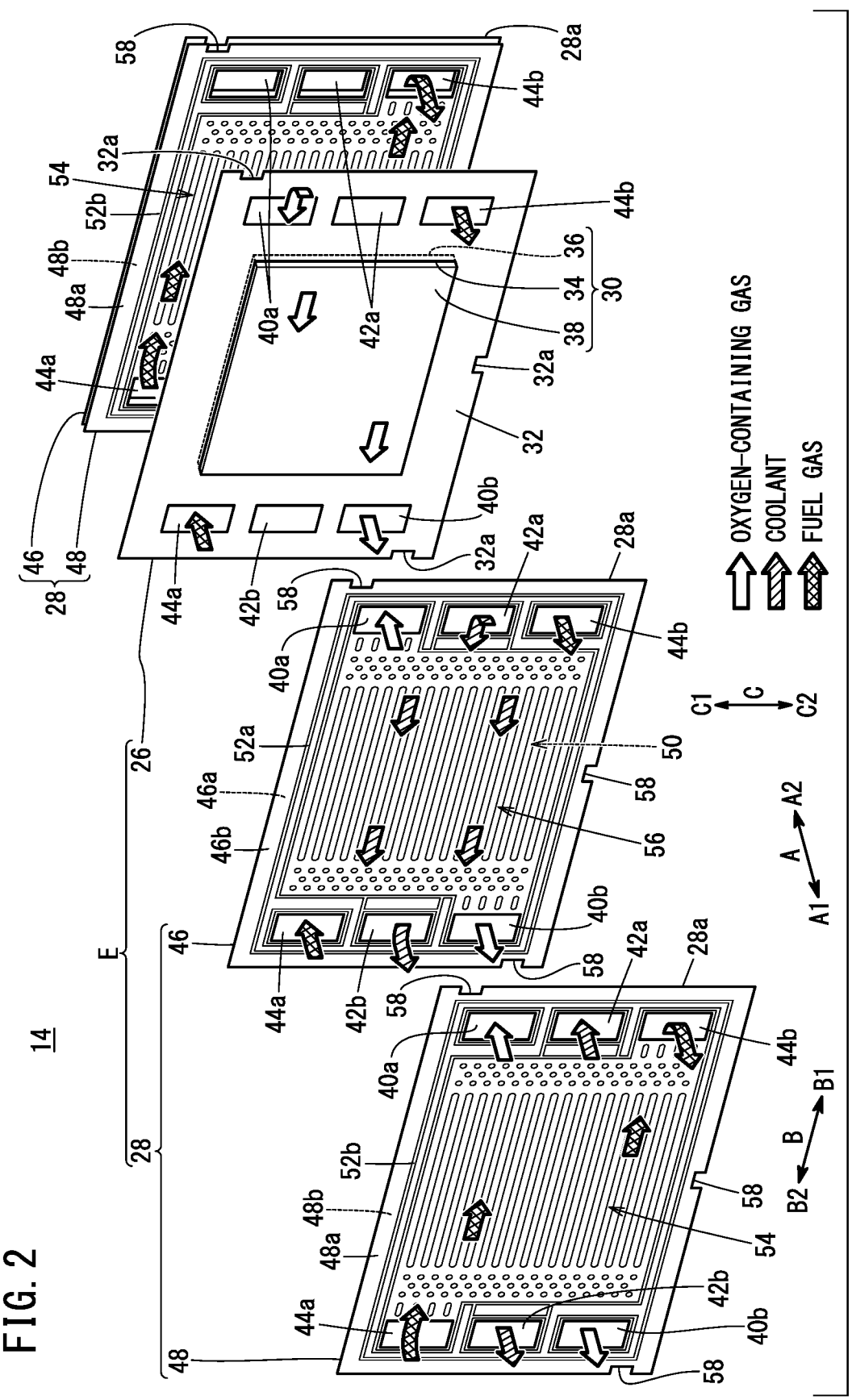
FIG. 2 is an exploded perspective view showing a power generation cell including a separator for a fuel cell according to an embodiment of the present invention.

As shown in FIG. 2, the power generation cell 14 includes a resin framed MEA 26, and a pair of separators 28 sandwiching the resin framed MEA 26. The resin framed MEA 26 includes a membrane electrode assembly (MEA) 30 and a resin frame member 32. The resin frame member 32 has a frame shape surrounding the outer periphery of the membrane electrode assembly (MEA) 30. The membrane electrode assembly 30 includes an electrolyte membrane 34, an anode 36, and a cathode 38. The anode 36 is provided on one surface of the electrolyte membrane 34. The cathode 38 is provided on the other surface of the electrolyte membrane 34.

For example, the electrolyte membrane 34 is a solid polymer electrolyte membrane (cation ion exchange membrane) such as a thin membrane of perfluorosulfonic acid containing water. The electrolyte membrane 34 is held between the anode 36 and the cathode 38. A fluorine based electrolyte may be used as the electrolyte membrane 34. Alternatively, an HC (hydrocarbon) based electrolyte may be used as the electrolyte membrane 34.

The anode 36 includes an anode catalyst layer (not shown) and an anode gas diffusion layer (not shown). The anode catalyst layer is joined to one surface of the electrolyte membrane 34. The anode gas diffusion layer is stacked on the anode catalyst layer. The cathode 38 includes a cathode catalyst layer (not shown) and a cathode gas diffusion layer (not shown). The cathode catalyst layer is joined to the other surface of the electrolyte membrane 34. The cathode gas diffusion layer is stacked on the cathode catalyst layer.

The anode catalyst layer is formed by depositing porous carbon particles uniformly on the surface of the anode gas diffusion layer together with ion conductive polymer binder, and platinum alloy is supported on surfaces of the carbon particles. The cathode catalyst layer is formed by depositing porous carbon particles uniformly on the surface of the cathode gas diffusion layer together with ion conductive polymer binder, and platinum alloy is supported on surfaces of the carbon particles.

Each of the cathode gas diffusion layer and the anode gas diffusion layer is in the form of an electrically conductive porous sheet such as a carbon paper or a carbon cloth. A porous layer (not shown) may be provided at, at least one of positions between the cathode catalyst layer and the cathode gas diffusion layer and between the anode catalyst layer and the anode gas diffusion layer.

For example, an inner marginal end portion of the resin frame member 32 is joined to an outer marginal portion of the membrane electrode assembly 30. As described above, by providing the resin frame member 32 for the membrane electrode assembly 30, it is possible to reduce the area of the electrolyte membrane 34 needed for forming one power generation cell 14. The electrolyte membrane 34 is relatively expensive. Therefore, the material cost of the membrane electrode assembly 30 can be reduced by reducing the area of the electrolyte membrane 34 needed for forming one power generation cell 14.

The joint structure of joining the resin frame member 32 and the membrane electrode assembly 30 together is not limited to the above described structure. In an example of the joint structure of joining the resin frame member 32 and the membrane electrode assembly 30 together, an inner marginal end portion of the resin frame member 32 is held between an outer marginal end portion of the cathode gas diffusion layer and an outer marginal end portion of the anode gas diffusion layer. In this case, the inner peripheral end surface of the resin frame member 32 may be close to, in contact with, or overlapped with the outer peripheral end surface of the electrolyte membrane 34.

In another example of the structure of joining the resin frame member 32 and the membrane electrode assembly 30 together, the outer marginal portion of the electrolyte membrane 34 protrudes outward beyond each of the cathode gas diffusion layer and the anode gas diffusion layer. Frame shaped films are provided on both surfaces of the outer marginal portion of the electrolyte membrane 34. A plurality of frame shaped films are stacked together on both sides of the electrolyte membrane 34. The stacked frame shaped films are joined together using adhesive, etc. to form the resin frame member 32.

As shown in FIGS. 1 and 2, at one end of each of the power generation cells 14, the end plate 22a, the insulators 20a, 20b in a long side direction (end on the arrow B1 side), an oxygen-containing gas supply passage 40a, a coolant supply passage 42a, and a fuel gas discharge passage 44b are arranged in the direction indicated by an arrow C. At the other end of each of the power generation cells 14, the end plate 22a, the insulators 20a, 20b in the longitudinal direction (end on the arrow B2 side), a fuel gas supply passage 44a, a coolant discharge passage 42b, and an oxygen-containing gas discharge passage 40b are arranged in the direction indicated by the arrow C.

An oxygen-containing gas is supplied to the oxygen-containing gas supply passage 40a. A coolant (e.g., any of pure water, ethylene glycol, and oil) is supplied to the coolant supply passage 42a. A fuel gas (e.g., hydrogen-containing gas) is discharged from the fuel gas discharge passage 44b. The fuel gas is supplied to the fuel gas supply passage 44a. The coolant is discharged from the coolant discharge passage 42b. The oxygen-containing gas is discharged from the oxygen-containing gas discharge passage 40b.

The oxygen-containing gas supply passage 40a is in fluid communication with each of the plurality of power generation cells 14 of the power generation cell stack body 12, the end plate 22a, and the insulators 20a, 20b in the stacking direction. That is, the oxygen-containing gas supply passage 40a extends through the end plate 22a, the insulators 20a, 20b, and the power generation cell stack body 12 in the stacking direction. Likewise, each of the coolant supply passage 42a, the fuel gas discharge passage 44b, the fuel gas supply passage 44a, the coolant discharge passage 42b, the oxygen-containing gas discharge passage 40b also extend through the end plate 22a, the insulators 20a, 20b, the power generation cell stack body 12 in the stacking direction.

In the embodiment of the present invention, each of the power generation cells 14 has one oxygen-containing gas supply passage 40a, one coolant supply passage 42a, one fuel gas discharge passage 44b, one fuel gas supply passage 44a, one coolant discharge passage 42b, and one oxygen-containing gas discharge passage 40b (hereinafter also referred to as the "fluid passages", collectively). However, the number of fluid passages provided for the power generation cells 14 is not limited. One or a plurality of fluid passages may be provided for the power generation cells 14. Further, the shape and the layout of each of the fluid passages are not limited to those of the embodiment of the present invention, depicted in FIGS. 1 and 2, and may be determined as necessary depending on the required specification.

As shown in FIG. 2, the separator 28 has a rectangular shape including a pair of long sides and a pair of short sides. The pair of long sides of the separator 28 are spaced from each other in the direction indicated by the arrow C. In the embodiment of the present invention, the pair of long sides of the separator 28 are arranged in parallel or substantially in parallel to each other. The pair of short sides of the separator 28 are spaced from each other in the direction indicated by the arrow B. In the embodiment of the present invention, the pair of short sides of the separator 28 are arranged in parallel or substantially in parallel to each other. The separator 28 is formed by stacking a first bipolar plate 46 and a second bipolar plate 48 together. In the state where the first bipolar plate 46 and the second bipolar plate 48 are stacked together, for example, outer peripheral portions of the first bipolar plate 46 and the second bipolar plate 48 are joined together by welding, brazing, crimping, etc. For example, each of the first bipolar plate 46 and the second bipolar plate 48 is formed by press forming of a metal thin plate to have a wavy shape in cross section. Examples of this metal thin plate include a steel plate, a stainless steel plate, and an aluminum plate, a plated steel plate or a titanium plate, or a metal plate having an anti-corrosive surface by surface treatment. It should be noted that insulating resin material may be provided on the outer marginal portion of the separator 28.

The first bipolar plate 46 includes an MEA side surface 46a facing the resin framed MEA 26, and a coolant side surface 46b as a back surface of the MEA side surface 46a. The second bipolar plate 48 includes an MEA side surface 48a facing the resin framed MEA 26, and a coolant side surface 48b as a back surface of the MEA side surface 48a.

Figure 3:
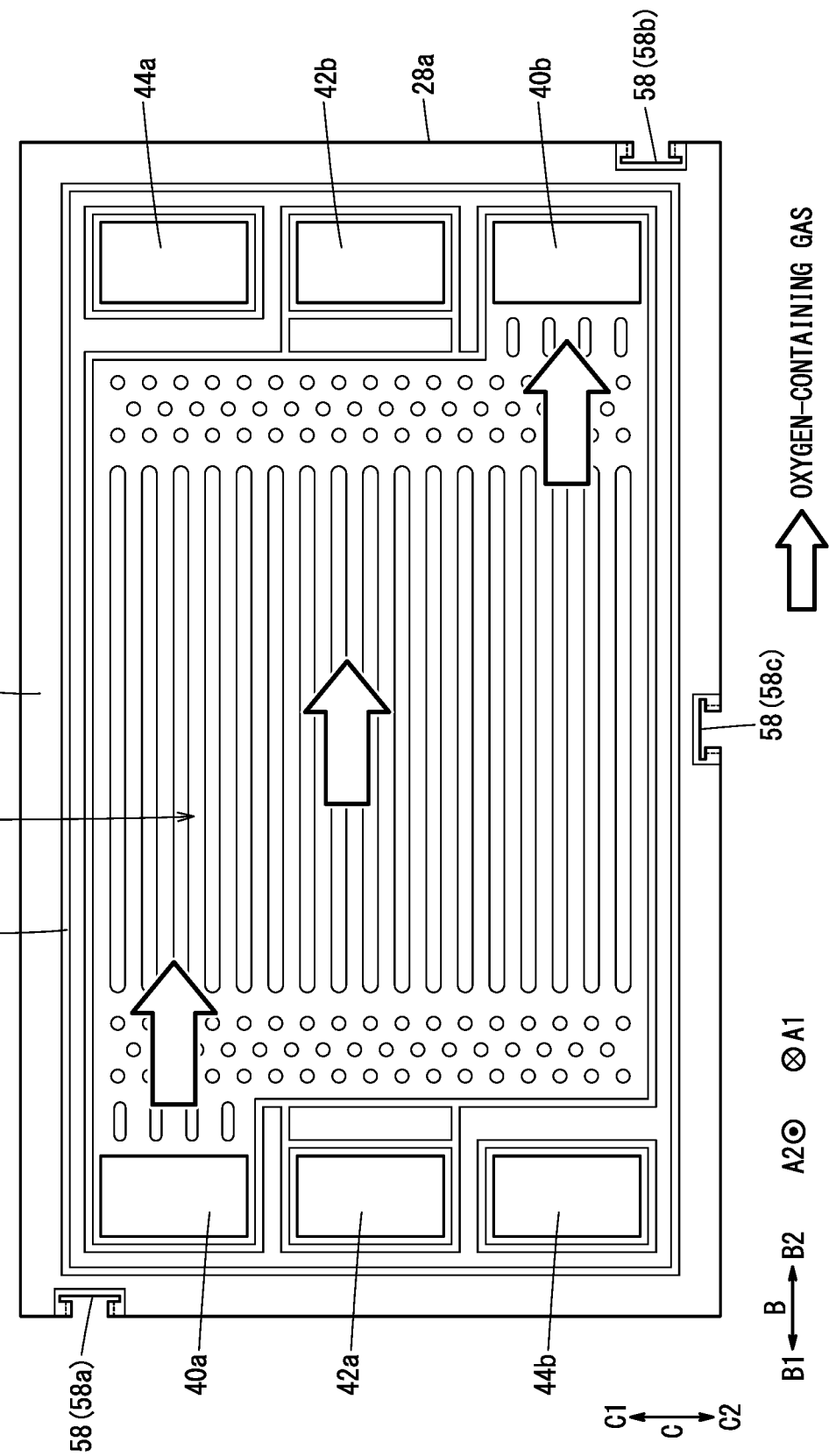
FIG. 3 is a view showing an MEA side surface of a first bipolar plate in the separator.

As shown in FIG. 3, a plurality of ridges are provided on the MEA side surface 46a of the first bipolar plate 46. The ridges extend straight in the direction indicated by the arrow B. The ridges form a straight oxygen-containing gas flow field 50 in grooves between the ridges. It should be noted that each of the ridges and the oxygen-containing gas flow field 50 may have a wavy shape. The oxygen-containing gas flow field 50 is connected to (in fluid communication with) the oxygen-containing gas supply passage 40a and the oxygen-containing gas discharge passage 40b for allowing the oxygen-containing gas to flow in surface directions (directions indicated by the arrow B and the arrow C) of the separator 28.

Further, a metal bead seal 52a is provided on the MEA side surface 46a of the first bipolar plate 46. The metal bead seal 52a protrudes toward the resin framed MEA 26 (FIG. 2). For example, the first bipolar plate 46 is formed by press forming to provide the metal bead 52a integrally with the first bipolar plate 46. Instead of the metal bead seal 52a, a protruding elastic seal comprising elastic material such as rubber may be provided on the MEA side surface 46a.

Part of the metal bead seal 52a of the first bipolar plate 46 surrounds the oxygen-containing gas flow field 50, the oxygen-containing gas supply passage 40a, and the oxygen-containing gas discharge passage 40b. In the area surrounded by the metal bead seal 52a, the oxygen-containing gas flow field 50 is connected to the oxygen-containing gas supply passage 40a and the oxygen-containing gas discharge passage 40b. Further, the other part of the metal bead seal 52a surrounds the fuel gas supply passage 44a, the fuel gas discharge passage 44b, the coolant supply passage 42a, and the coolant discharge passage 42b, individually. Thus, the metal bead seal 52a prevents the fuel gas and the coolant from flowing into the oxygen-containing gas flow field 50.

As shown in FIG. 2, a plurality of ridges are provided on the MEA side surface 48a of the second bipolar plate 48. The ridges extend straight in the direction indicated by the arrow B. The ridges form a straight fuel gas flow field 54 in grooves between the ridges. It should be noted that each of the ridges and the fuel gas flow field 54 may have a wavy shape. The fuel gas flow field 54 is connected to (in fluid communication with) the fuel gas supply passage 44a and the fuel gas discharge passage 44b for allowing the fuel gas to flow in surface directions (directions indicated by the arrow B and the arrow C) of the separator 28.

Further, a metal bead seal 52b is provided on the MEA side surface 48a of the second bipolar plate 48. The metal bead seal 52b protrudes toward the resin framed MEA 26 (FIG. 2). For example, the second bipolar plate 48 is formed by press forming to provide the metal bead seal 52b integrally with the second bipolar plate 48. Instead of the metal bead seal 52b, a protruding elastic seal comprising elastic material such as rubber may be provided on the MEA side surface 48a.

Part of the metal bead seal 52b of the second bipolar plate 48 surrounds the fuel gas flow field 54, the fuel gas supply passage 44a, and the fuel gas discharge passage 44b. In the area surrounded by the metal bead seal 52b, the fuel gas flow field 54, the fuel gas supply passage 44a, the fuel gas discharge passage 44b are connected together. Further, the other part of the metal bead seal 52b surrounds the oxygen-containing gas supply passage 40a, the oxygen-containing gas discharge passage 40b, the coolant supply passage 42a, and the coolant discharge passage 42b individually. In the structure, the metal bead seal 52b prevents the oxygen-containing gas and the coolant from flowing into the fuel gas flow field 54.

A coolant flow field 56 is provided between a surface 46b of the first bipolar plate 46 along which the coolant flows and a surface 48b of the second bipolar plate 48 along which the coolant flows. The coolant flow field 56 is connected to (in fluid communication with) the coolant supply passage 42a and the coolant discharge passage 42b. Thus, the coolant flow field 56 allows the coolant to flow in the surface directions of the separator 28 (directions indicated by the arrows B and C).

When the first bipolar plate 46 and the second bipolar plate 48 are stacked together, the coolant flow field 56 is formed between the back surface of the oxygen-containing gas flow field 50 of the first bipolar plate 46 and the back surface of the fuel gas flow field 54 of the second bipolar plate 48. Further, in the state where the coolant side surface 46b and the coolant side surface 48b face each other, the area around the fluid passage of the coolant side surface 46b and the area around the fluid passage of the coolant side surface 46b are joined together, e.g., by welding, brazing, etc.

For example, the power generation cell stack body 12 is formed by stacking a plurality of stack units E (FIG. 2) together. Each of the stack units E is formed by overlapping and joining one separator 28 (the first bipolar plate 46 and the second bipolar plate 48), and one resin framed MEA 26 (membrane electrode assembly 30) together. In each of the stack units E, the outer marginal portion of the resin frame member 32 may be joined to the outer marginal portion 28a of the separator 28, e.g., by welding, adhesion, etc. beforehand. It should be noted that each of the stack units E is not limited to the unit formed by joining one separator 28 and one resin framed MEA 26 together. It is adequate that each of the stack units E is a unit where a power generation cell stack body 12 can be formed eventually by stacking a plurality of stack units E together.

The separator 28 of each of the stack units E is provided with a positioning section 58. When the plurality of stack units E are stacked together, by overlapping the positioning sections 58 of the stack units E, the stack units E can be positioned in alignment with each other accurately. In the embodiment of the present invention, the positioning section 58 is a groove (recess) recessed from the outside to the inside of the separator 28 in the outer marginal portion 28a of the separator 28.

Further, as shown in FIGS. 3 and 4A to 4C, in the embodiment of the present invention, the positioning section 58 includes a first positioning section 58a, a second positioning section 58b, and a third positioning section 58c. That is, in total, three positioning sections 58 are provided for one separator 28.

As shown in FIG. 3, the first positioning section 58a is provided in the vicinity of the end on the arrow C1 side of the short side defining the end of the separator 28 on the arrow B1 side. The second positioning section 58b is provided in the vicinity of the end on the arrow C2 side of the short side defining the end of the separator 28 on the arrow B2 side. That is, the first positioning section 58a and the second positioning section 58b are disposed at diagonal positions of the separator 28. It should be noted that, in the direction indicated by the arrow C, the second positioning section 58b may be disposed close to the end of the separator 28 in the direction indicated by the arrow C2, in comparison with the first positioning section 58a. The third positioning section 58c is provided at the center or at substantially the center of the long side defining the end of the separator 28 on the arrow C2 side. Hereinafter, the first positioning section 58a, the second positioning section 58b, and the third positioning section 58c are also simply referred to as the positioning sections 58, respectively, when it is not necessary to distinguish these positioning sections 58 from one another.

Figure 4A:
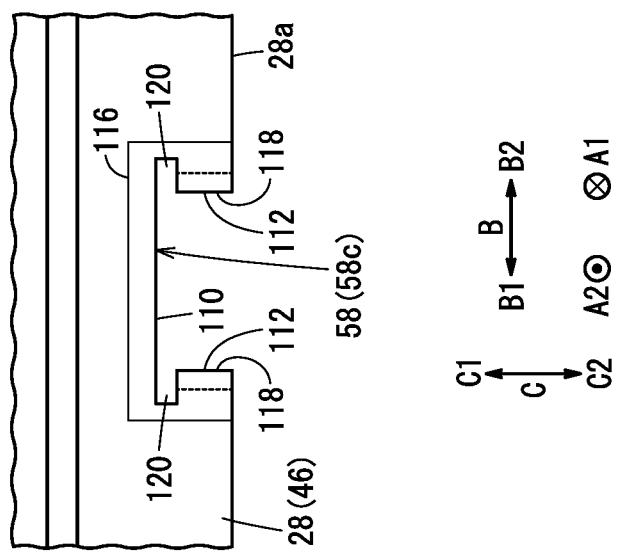
FIG. 4A is an enlarged view showing a first positioning section in FIG. 3.
Figure 4B:
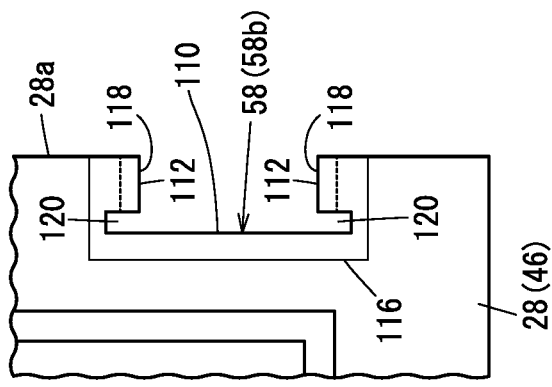
FIG. 4B is an enlarged view showing a second positioning section in FIG. 3.
Figure 4C:
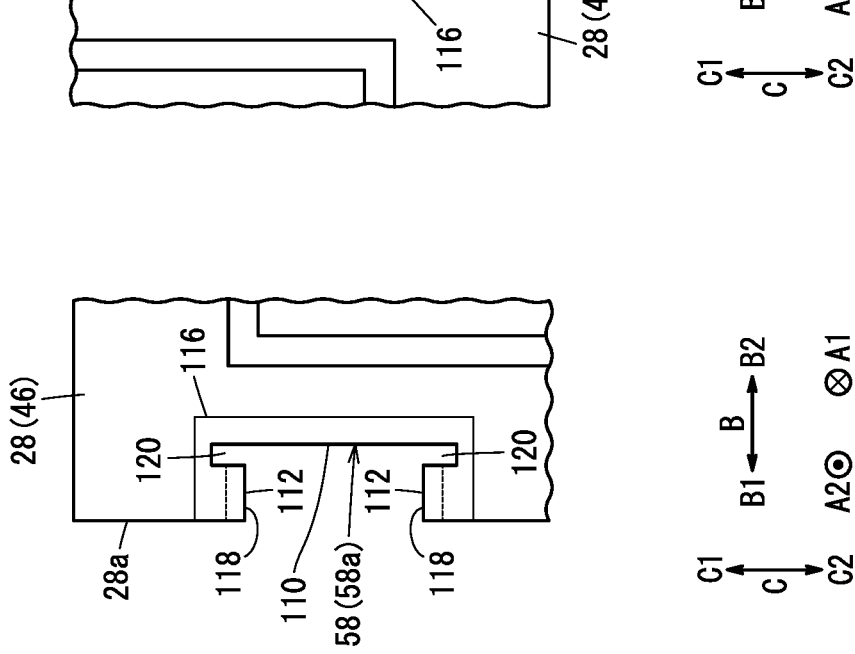
FIG. 4C is an enlarged view showing a third positioning section in FIG. 3.

As shown in FIGS. 4A to 4C, each of the positioning sections 58 has a first side 110, and a pair of second sides 112. The first side 110 is positioned inward of the outer marginal portion 28a in the separator 28, and extends along the outer marginal section 28a. The pair of second sides 112 are spaced from each other, and face each other in the direction in which the outer marginal portion 28a extends.

That is, as shown in FIG. 4A, the first side 110 of the first positioning section 58a is disposed at a position spaced from the short side defining the end of the separator 28 on the arrow B1 side, in the direction indicated by the arrow B2. The first side 110 of the first positioning section 58a extends in the direction in which the short side extends (direction indicated by the arrow C). The pair of second sides 112 of the first positioning section 58a are spaced from each other, and face each other in the direction indicated by the arrow C (in the groove width direction).

As shown in FIG. 4B, the first side 110 of the second positioning section 58b is disposed at a position spaced from the short side defining the end of the separator 28 on the arrow B2 side, in the direction indicated by the arrow B1. The first side 110 of the second positioning section 58b extends in the direction in which the short side extends (direction indicated by the arrow C). The pair of second sides 112 of the second positioning section 58b are spaced from each other, and face each other in the direction indicated by the arrow C (in the groove width direction).

As shown in FIG. 4C, the first side 110 of the third positioning section 58c is disposed at a position spaced from the long side of the separator 28 on the arrow C2 side, on the arrow C1 side. The first side 110 of the third positioning section 58c extends in the direction in which the long side extends (direction indicated by the arrow B). The pair of second sides 112 of the third positioning section 58c are spaced from each other, and face each other in the direction indicated by the arrow B (groove width direction).

Hereinafter, with regard to the positioning section 58, the length of the first side 110 will also be referred to as the width, and the length of the second side 112 will also be referred to as the depth. It should be noted that the layout and the number of positioning sections 58 provided in the stack unit E is not limited those shown in FIG. 3, and can be determined freely depending on the shape, etc. of the separator 28 and the resin framed MEA 26. Further, in the embodiment of the present invention, as shown in FIG. 2, in the power generation cell 14, the outer marginal portion of the resin frame member 32 is stacked on the outer marginal portion 28a of the separator 28. A groove 32a is provided in the outer marginal portion of the resin frame member 32, in a part facing the positioning section 58 of the separator 28. As viewed in the stacking direction, the size of the groove 32a is larger than the size of the positioning section 58. That is, the depth of the groove 32a is larger than the depth of the positioning section 58. The groove width of the groove 32a is larger than the groove width of the positioning section 58. In the structure, as described later, when an insertion section 86 of a guide bar 66 is inserted into the positioning section 58, contact between the resin frame member 32 and the insertion section 86 is avoided.

Figure 5A:
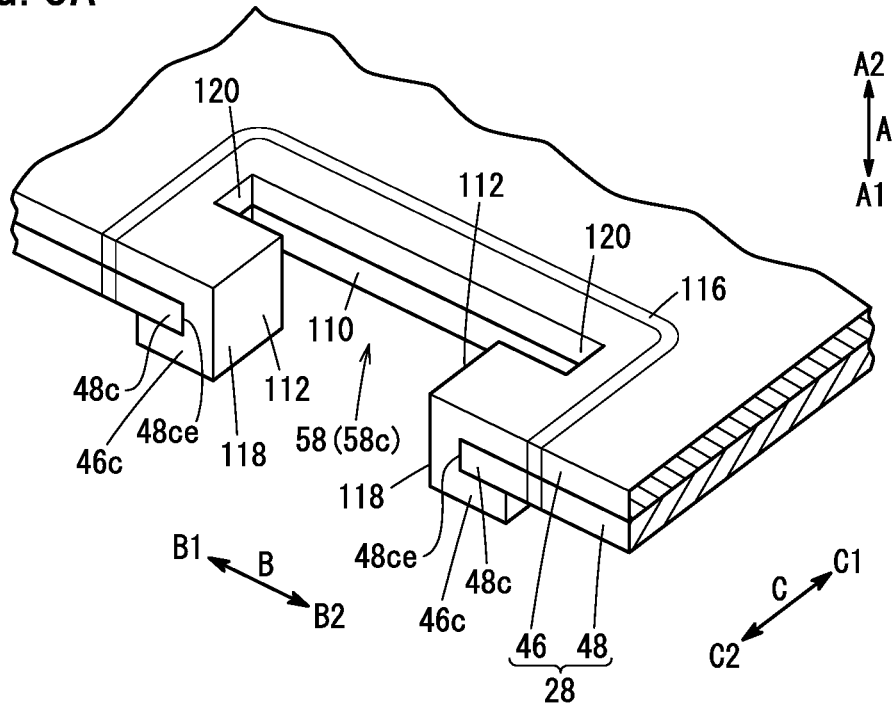
FIG. 5A is a perspective view showing the third positioning section in FIG. 4C.

As shown in FIG. 5A, the marginal portion of the positioning section 58 of the separator 28 has a bent surface 118. The bent surface 118 is provided in at least one of the pair of second sides 112 of the positioning section 58 (both of the pair of second sides 112 of the positioning section 58 in the embodiment of the present invention). The bent surface 118 is formed by bending a first part 46c provided in the first bipolar plate 46 in a manner to cover a second part 48c provided in the second bipolar plate 48. The second part 48c is an end of the second bipolar plate 48, and extends along the second side 112 of the positioning section 58. The first part 46c is a protruding piece of the first bipolar plate 46, and protrudes toward the inside of the positioning section 58 (groove) from the end surface 48ce of the second part 48c. The first part 46c is bent, e.g., by crimping to cover the end surface 48ce of the second part 48c and its adjacent area.

Figure 5B:
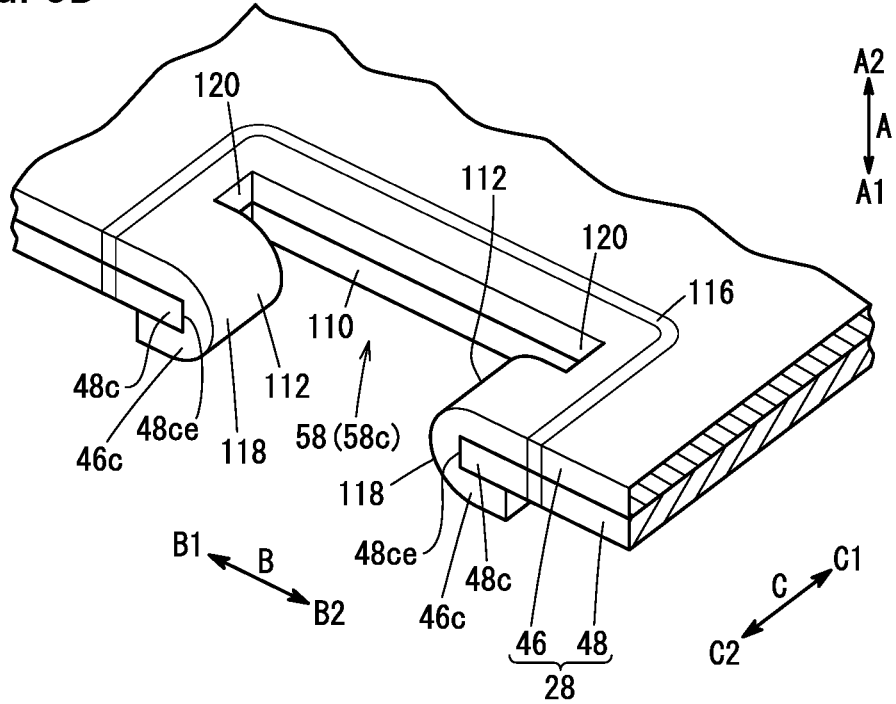
FIG. 5B is a perspective view showing a third positioning section according to a modified embodiment.

In the embodiment of the present invention, as shown in FIG. 5A, the bent surface 118 is formed by bending the first part 46c straight. However, the present invention is not limited specially in this respect. For example, in the case of the bent surface 118 shown in FIG. 5B, the first part 46c may be curved to form a curved surface as the bent surface 118. In the embodiment of the present invention, clearance 120 for allowing the crimping process to be performed easily is provided between both ends of the first side 110 in the direction in which the first side 110 extends and the pair of second sides 112 (bent surface 118). The clearance 120 is in the form of a recess recessed from the end surface 48ce of the second part 48c toward the inside of the separator 28 (outside of the positioning section 58).

Though not shown, both of the first bipolar plate 46 and the second bipolar plate 48 may be bent to form the bent surface 118. That is, for example, in the state where the first part 46c of the first bipolar plate 46 and the second part 48c of the second bipolar plate 48 are overlapped with each other, both of the first part 46c and the second part 48c may be bent (bent and crimped) to form the bent surface 118.

A welding section 116 for welding the first bipolar plate 46 and the second bipolar plate 48 together along the positioning section 58, is provided around the positioning section 58 of the separator 28. That is, the welding section 116 is in the form of a line extending along each of the first side 110 and the second sides 112. The welding section 116 is disposed inside the separator 28, inside each of the first side 110 and the second sides 112 of the positioning section 58.

Hereinafter, with reference to FIGS. 1 to 3, operation of the fuel cell stack 16 including the power generation cell stack body 12 will be described briefly. In the case of performing power generation of the fuel cell stack 16, the fuel gas is supplied to the fuel gas supply passage 44a, the oxygen-containing gas is supplied to the oxygen-containing gas supply passage 40a, and the coolant is supplied to the coolant supply passage 42a.

As shown in FIG. 3, the oxygen-containing gas is supplied from the oxygen-containing gas supply passage 40a into the oxygen-containing gas flow field 50. The oxygen-containing gas supplied into the oxygen-containing gas flow field 50 flows along the oxygen-containing gas flow field 50 in the direction indicated by the arrow B, and the oxygen-containing gas is supplied to the cathode 38 of the membrane electrode assembly 30. In the meanwhile, as shown in FIG. 2, the fuel gas is supplied from the fuel gas supply passage 44a into the fuel gas flow field 54. The fuel gas supplied into the fuel gas flow field 54 moves along the fuel gas flow field 54 in the direction indicated by the arrow B, and the fuel gas is supplied to the anode 36 of the membrane electrode assembly 30.

Thus, in each of the membrane electrode assemblies 30, the oxygen-containing gas and the fuel gas are consumed in electrochemical reactions in the cathode catalyst layer and the anode catalyst layer. As a result, power generation is performed.

The oxygen-containing gas (oxygen-containing exhaust gas) which has not been consumed in the electrochemical reactions flows from the oxygen-containing gas flow field 50 into the oxygen-containing gas discharge passage 40b. The oxygen-containing exhaust gas which flowed into the oxygen-containing gas discharge passage 40b flows through the oxygen-containing gas discharge passage 40b in the direction indicated by the arrow A, and the oxygen-containing exhaust gas is discharged from the fuel cell stack 16. Likewise, the fuel gas (fuel exhaust gas) which has not been consumed in the electrochemical reaction flows from the fuel gas flow field 54 into the fuel gas discharge passage 44b. The fuel exhaust gas which flowed into the fuel gas discharge passage 44b flows through the fuel gas discharge passage 44b in the direction indicate by the arrow A, and the fuel gas is discharged from the fuel cell stack 16.

The coolant flows from the coolant supply passage 42a into the coolant flow field 56. The coolant which flowed into the coolant flow field 56 moves along the coolant flow field 56 in the direction indicated by the arrow B, and the heat exchange is performed between the coolant and the membrane electrode assembly 30. After the heat exchange is performed, the coolant flows into the coolant discharge passage 42b. The coolant which flowed into the coolant discharge passage 42b flows through the coolant discharge passage 42b in the direction indicated by the arrow A, and the coolant is discharged from the fuel cell stack 16.

Hereinafter, with reference to mainly FIGS. 6 to 9, an example of a production apparatus 10 for producing the power generation cell stack body 12 by stacking the plurality of stack units E while overlapping the positioning sections 58 will be described. For example, the production apparatus 10 is applicable to the case of obtaining the power generation cell stack body 12 in FIG. 1 by stacking the plurality of stack units E in the stacking direction indicated by an arrow X. In the embodiment of the present invention, the plurality of stack units E are stacked together upward (on the arrow X1 side). That is, the stacking direction of the stack units E stacked by the production apparatus 10 is oriented in the vertical direction. In the embodiment of the present invention, the direction indicated by the arrow X2 of the production apparatus 10 shown in FIGS. 6 to 9 corresponds to the direction indicated by the arrow A1 of the separator 28 in FIGS. 1 to 5B.

The production apparatus 10 includes a placement frame 60, a pressure applying section 62, a drive mechanism 64, the guide bar 66, and a support mechanism 68. In the production apparatus 10 of FIG. 6, the pressure applying section 62 and the drive mechanism 64 are not shown. Further, in the stack units E in FIG. 6, regardless of whether or not the upper surface of the stack unit E is the separator 28, the positioning section 58 and the bent surface 118 are shown for the purpose of convenience. This is for ease of explaining the positional relationship between the positioning section 58 and the guide bar 66.

The placement frame 60 has a placement surface 70 where the stack units E are stacked in the stacking direction (direction indicated by the arrow X). The pressure applying section 62 is driven by the drive mechanism 64. Thus, the pressure applying section 62 can move toward the placement frame 60 in the stacking direction, or move away from the placement frame 60 in the stacking direction.

Figure 8:
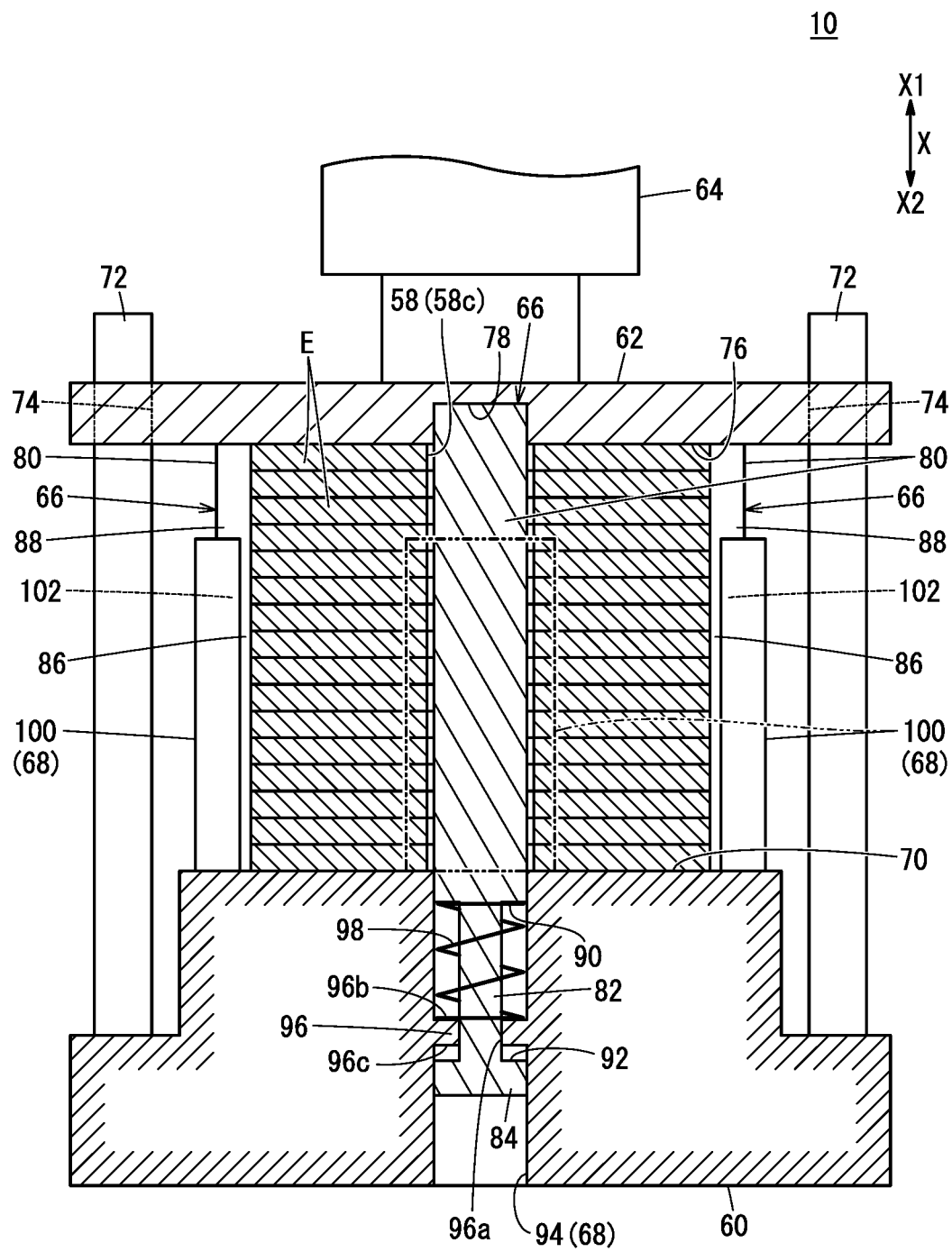
FIG. 8 is a view showing a state where a pressure applying section is moved closer to a placement frame in FIG. 7.
Figure 9:
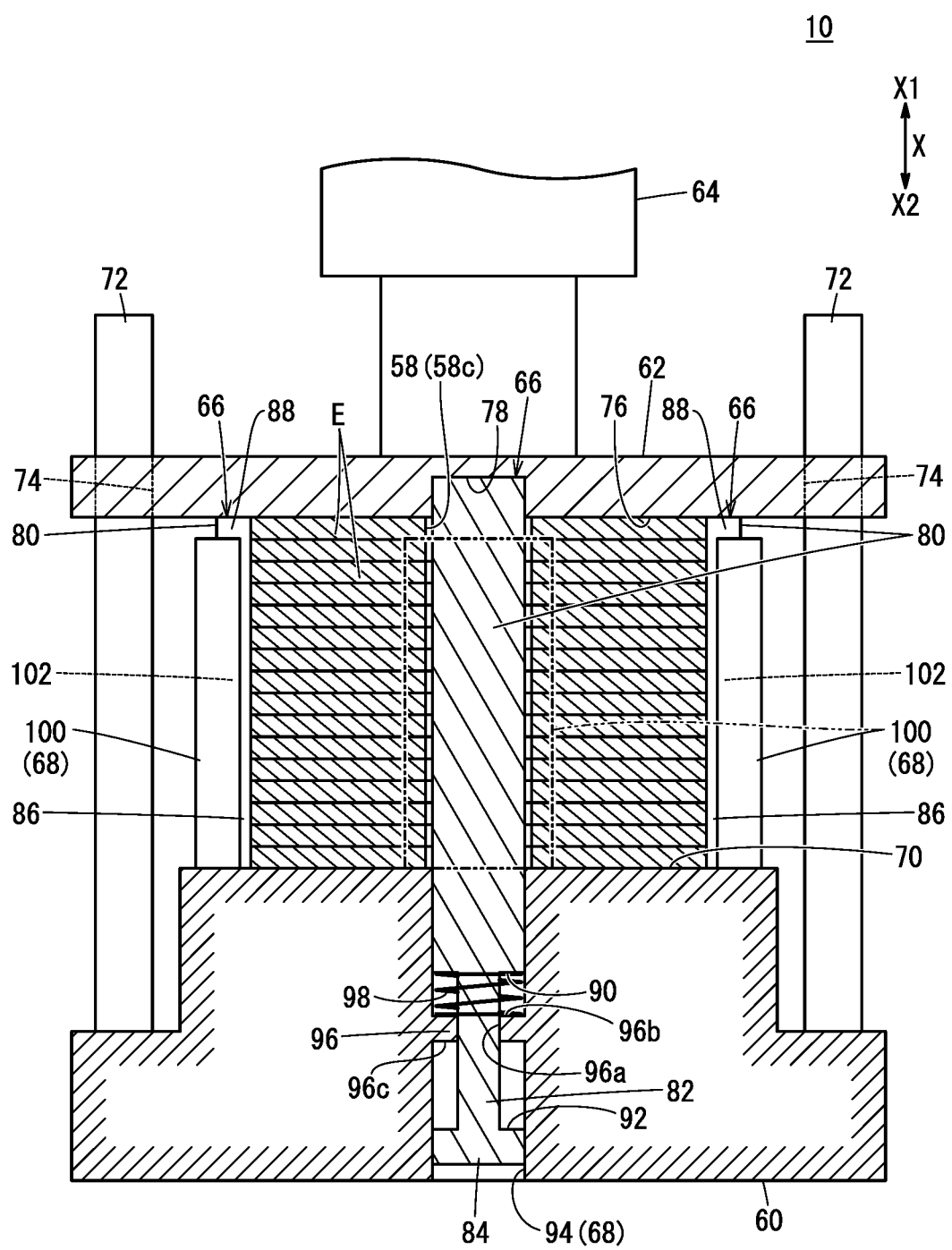
FIG. 9 is a view showing a state where the pressure applying section is moved further close to the placement frame in FIG. 8.

Guide posts 72 protruding in the stacking direction are disposed, at positions outside the placement surface 70 of the placement frame 60. Further, the pressure applying section 62 has engagement sections 74. As shown in FIGS. 8 and 9, when the pressure applying section 62 moves closer to the placement frame 60, up to a position spaced from the placement frame 60 by a predetermined distance, the engagement sections 74 are engaged with the guide posts 72. In the embodiment of the present invention, the engagement sections 74 are through holes provided for the pressure applying section 62. The guide posts 72 are slidably inserted into these engagement sections 74 in a manner that the engagement sections 74 are engaged with the guide posts 72. In the state where the engagement sections 74 are engaged with the guide posts 72, the pressure applying section 62 moves closer to, or moves away from the placement frame 60 in a manner that the moving direction of the pressure applying section 62 is oriented in the stacking direction.

Further, the pressure applying section 62 has a pressure applying surface 76 and a contact section 78. As shown in FIGS. 8 and 9, when the pressure applying section 62 moves closer to the placement frame 60, the pressure applying surface 76 contacts the stack unit E stacked on the placement surface 70. When the pressure applying section 62 moves closer to the placement frame 60, the contact section 78 contacts the upper surface of the guide bar 66.

The guide bar 66 protrudes from the placement surface 70 of the placement frame 60 in the stacking direction. Further, the guide bar 66 is movable relative to the placement surface 70 in the stacking direction. Therefore, in the state where the contact section 78 of the pressure applying section 62 contacts the upper surface of the guide bar 66, by moving the pressure applying section 62 further to the placement frame 60, it is possible to move the guide bar 66 and the pressure applying section 62 together at the same speed.

Figure 6:
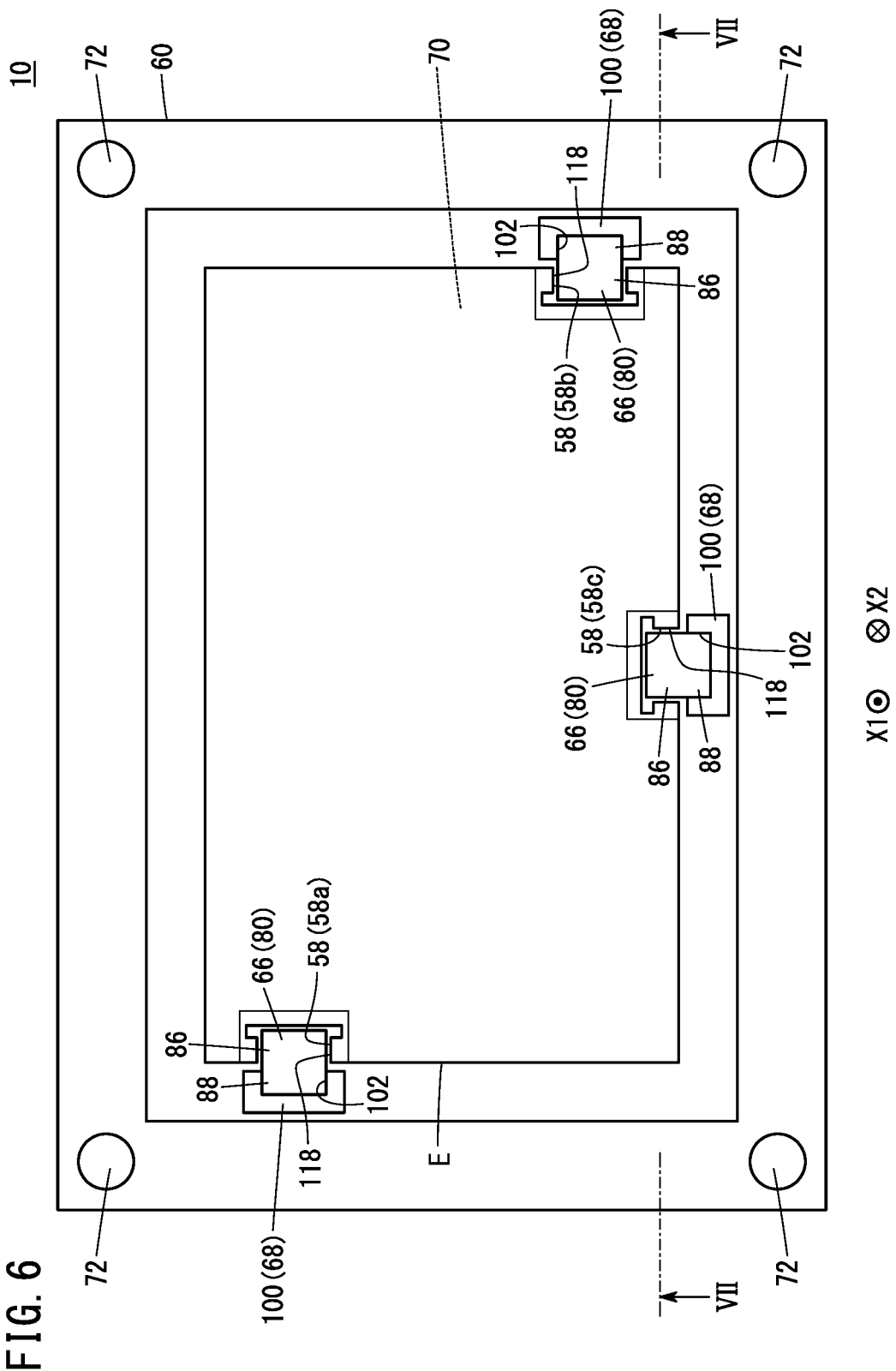
FIG. 6 is a schematic plan view showing an apparatus for producing a power generation cell stack body of a fuel cell stack.

In the embodiment of the present invention, the guide bar 66 is in the form of a quadrangular rod extending in the stacking direction. Hereinafter, an end of the guide bar 66 close to the placement frame 60 in the direction in which the guide bar 66 extends will also be referred to as the proximal end (end on the arrow X2 side). The end of the guide bar 66 opposite to the placement frame 60 in the direction in which the guide bar 66 extends will also be referred to as the front end (end on the arrow X1 side). For example, the guide bar 66 is provided in correspondence with the number and the layout of the positioning sections 58 of the stack units E in the state where the stack units E are stacked on the placement surface 70. Therefore, in the embodiment of the present invention, as shown in FIG. 6, three guide bars 66 corresponding respectively to the first positioning section 58a, the second positioning section 58b, and the third positioning section 58c are provided for the placement frame 60. These third guide bars 66 may have the same structure except the positions relative to the placement surface 70.

Figure 7:
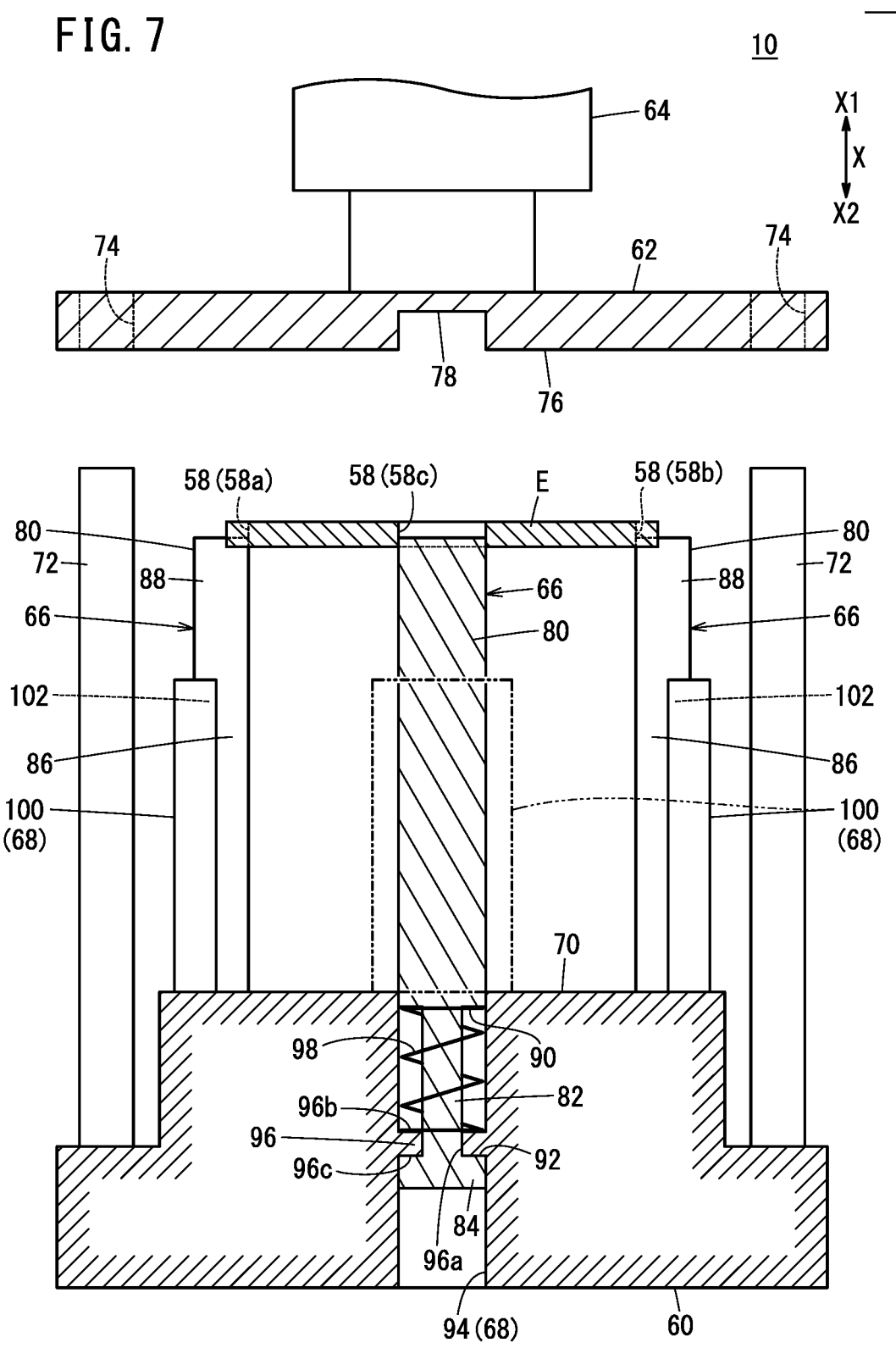
FIG. 7 is a schematic cross sectional view taken along a line VII-VII indicated by an arrow in FIG. 6.

As shown in FIGS. 7 to 9, specifically, each of the guide bar 66 includes a main body section 80, a narrow section 82, and a stopper section 84. The main body section 80, the narrow section 82, and the stopper section 84 are arranged in this order from the front end to the proximal end of the guide bar 66 in the direction in which the guide bar 66 extends. Though not shown, the narrow section 82 and the stopper section 84 are detachably joined together. In the direction in which the main body section 80 extends, the majority part at the front end of the main body section 80 protrudes from the placement surface 70 in the stacking direction. The length by which the main body section 80 protrudes from the placement surface 70 is larger than the length of the plurality of stack units E in the stacking direction when the predetermined number of stack units E of the power generation cell stack body 12 are stacked together on the placement surface 70.

Further, the main body section 80 includes an insertion section 86 and an exposed section 88. When the stack units E are stacked on the placement surface 70, the insertion section 86 is inserted into the positioning section 58 of the stack unit E. When the insertion section 86 is inserted into the positioning section 58, the exposed section 88 is disposed outside the positioning section 58 as viewed in the stacking direction. That is, the shape of the main body section 80 in the stacking direction at least partially corresponds to the shape of the positioning section 58 viewed in the stacking direction. In the embodiment of the present invention, the shape of the guide bar 66 viewed in the stacking direction has a quadrangular shape. The length of the side of the guide bar 66 in the width direction of the positioning section 58 is slightly smaller than the width of the positioning section 58. Further, the length of the side of the guide bar 66 in the depth direction of the positioning section 58 is larger than the depth of the positioning section 58.

As described above, in the state where the insertion section 86 is inserted into the positioning section 58, the stack units E are stacked together on the placement surface 70 while the positioning section 58 moves along the guide bar 66. In this manner, it is possible to guide the stack units E to a predetermined stack position on the placement surface 70. In the plurality of stack units E stacked on the placement surface 70 in this manner, the positioning sections 58 are overlapped with each other in the stacking direction through the guide bars 66. As a result, it becomes possible to stack the plurality of stack units E together in the state where the stack units E are positioned with respect to each other.

Though not shown, the outer dimension of the cross section of the narrow section 82 perpendicular to the direction in which the narrow section 82 extends is smaller than the outer dimension of the cross section of the main body section 80 in which the main body section 80 extends. The outer dimension of the cross section of the narrow section 82 perpendicular to the direction in which the narrow section 82 extends is smaller than the outer dimension of the cross section of the stopper section 84 perpendicular to the direction in which the stopper section 84 extends. Therefore, a first step 90 is formed between the main body section 80 and the narrow section 82. Further, a second step 92 is formed between the narrow section 82 and the stopper section 84. In the embodiment of the present invention, the outer dimension of the main body section 80 and the outer dimension of the stopper section 84 are the same. However, the outer dimension of the main body section 80 and the outer dimension of the stopper section 84 may be different from each other.

The proximal end of the main body section 80, the narrow section 82, and the stopper section 84 can be inserted into a support hole 94. The support hole 94 is formed in the placement frame 60 in the stacking direction. The proximal end of the main body section 80, the narrow section 82, and the stopper section 84 are movable inside the support hole 94 in the stacking direction. Though not shown, the dimension of the cross section of the support hole 94 perpendicular to the direction in which the support hole 94 extends is the same as the outer dimension of each of the main body section 80 and the stopper section 84, or slightly larger than the outer dimension of each of the main body section 80 and the stopper section 84. Therefore, the main body section 80 and the stopper section 84 are slidable inside the support hole 94 in the stacking direction. Thus, the direction in which the guide bar 66 extends is kept oriented in the stacking direction.

The support hole 94 has a limited section 96. The limited section 96 is disposed between the first step 90 and the second step 92 of the guide bar 66 inserted into the support hole 94. As viewed in the direction in which the support hole 94 extends, the limited section 96 protrudes from the inner wall surface of the support hole 94 toward the center of the support hole 94. Further, a through hole 96a into which the narrow section 82 is inserted is formed at the center of the limited section 96. Though not shown, the dimension of the cross section of the through hole 96a oriented in the direction perpendicular to the direction in which the support hole 94 extends is smaller than the outer dimension of each of the main body section 80 and the stopper section 84. Further, the dimension of the cross section of the through hole 96a in the direction perpendicular to the direction in which the support hole 94 extends is slightly larger than the above described outer dimension of the narrow section 82.

The end surface 96b at the front end of the limited section 96 is spaced from the first step 90, and faces the first step 90. An elastic member 98 is disposed between the end surface 96b at the front end of the limited section 96 and the first step 90. In the embodiment of the present invention, the elastic member 98 is a coil spring, and the expansion/compression direction of the elastic member 98 is oriented in the stacking direction. Further, the narrow section 82 is inserted into the elastic member 98. By this elastic member 98, the guide bar 66 is biased elastically in the direction protruding from the placement surface 70.

The end surface 96c at the proximal end of the limited section 96 faces the second step 92 in a manner that the end surface 96c of the limited section 96 can contact the second step 92. As described above, further movement of the guide bar 66 biased by the elastic force of the elastic member 98 in the direction protruding from the placement surface 70 is limited by the contact between the end surface 96c at the proximal end of the limited section 96 and the second step 92 (FIG. 0.7). Further, as shown in FIGS. 8 and 9, the elastic member 98 is deformed elastically in the direction in which the elastic member 98 is compressed between the end surface 96b at the front end of the limited section 96 and the first step 90. Thus, the guide bar 66 is slidable in the direction in which the guide bar 66 enters the placement surface 70. When the guide bar 66 moves in a direction in which the guide bar 66 enters the placement surface 70, the second step 92 is spaced from the end surface 96c at the proximal end of the limited section 96.

A support bar 100 is provided adjacent to the guide bar 66 of the placement frame 60. The support bar 100 protrudes along the guide bar 66 in the stacking direction. The support bar 100 is fixed to the placement frame 60. A recess 102 (FIG. 6) is formed in the support bar 100. The exposed portion 88 of the guide bar 66 is accommodated in the recess 102, slidably in the stacking direction. The protruding length of the support bar 100 from the placement surface 70 is smaller than the length of the plurality of stack units E that are stacked together in the stacking direction (FIG. 9). The stack units E are compressed on the placement surface 70 as described later. The support bar 100 and the support hole 94 of the placement frame 60 form the support mechanism 68. In the support mechanism 68, the support bar 100 and the support hole 94 of the placement frame 60 movably support the guide bars 66 in the stacking direction. Thus, the direction in which the guide bars 66 extend can be kept oriented in the stacking direction.

Hereinafter, an example of producing the power generation cell stack body 12 in FIG. 1 by stacking the plurality of stack units E together using the production apparatus 10 in FIGS. 6 to 9 will be described. In the method of producing the power generation cell stack body 12, firstly, a stacking step is performed. In the stacking step, as shown in FIG. 7, the drive mechanism 64 moves the pressure applying section 62 to a position away from the placement frame 60. Therefore, the contact section 78 of the pressure applying section 62 moves away from the guide bar 66 as well. Therefore, by the elastic force of the elastic member 98, the guide bar 66 is positioned by the second step 92 in abutment with the end surface 96c of the limited section 96 inside the support hole 94 of the placement frame 60. That is, the protruding length of the main body section 80 protruding from the placement surface 70 becomes the maximum.

In this state, a predetermined number of stack units E of the power generation cell stack body 12 are stacked together on the placement surface 70. Specifically, the insertion section 86 of the guide bar 66 is inserted into the positioning section 58 of each of the stack units E in the stacking direction. Further, while aligning the positioning section 58 with the insertion section 86, the stack units E are moved downward. This movement may be performed by dropping the stack units E onto the placement surface 70 in the state where the insertion section 86 is inserted into the positioning section 58.

By moving the positioning section 58 along the insertion section 86 as described above, the stack units E are guided to the stack position. In this manner, by guiding each of the plurality of stack units E to the stack position, and stacking the plurality of stack units E together, the positioning sections 58 of the stack units E are positioned through the guide bar 66 in the state where the stack units E are overlapped together through the guide bar 66 in the stacking direction. That is, in the state where the positional displacement of the predetermined number of stack units E are suppressed, the stack units E can be stacked together on the placement surface 70.

Next, a compression step is performed. In the compression step, the drive mechanism 64 moves the pressure applying section 62 toward the placement frame 60 on which the plurality of stack units E are stacked together in the stacking step. As a result, as shown in FIG. 8, the pressure applying surface 76 of the pressure applying section 62 is brought into contact with the stack unit E. Further, the contact section 78 of the pressure applying section 62 is brought into contact with the front end of the guide bar 66. In this state, as shown in FIG. 9, the pressure applying section 62 is moved further toward the placement frame 60 to compress the plurality of stack units E between the placement surface 70 of the placement frame 60 and the pressure applying surface 76 of the pressure applying section 62.

At this time, the guide bar 66 is pressed against the pressure applying section 62 through the contact section 78. Therefore, the guide bar 66 moves in a direction entering the support hole 94 of the placement frame 60 against the elastic force of the elastic member 98. That is, in the compression step, while the guide bar 66 in the state where the insertion section 86 follows the positioning section 58 is moved in the same direction as the moving direction of the pressure applying section 62, the plurality of stack units E are compressed.

In the compression step, the timing at which the pressure applying surface 76 and the stack unit E contact together may be the same as, or may be earlier than the timing at which the contact section 78 contacts the front end of the guide bar 66. For example, by adjusting the positions of the pressure applying surface 76 and the contact section 78 relative to each other in the stacking direction, it is possible to adjust the timing at which the pressure applying surface 76 contacts the stack unit E and the timing at which the contact section 78 contacts the guide bar 66. For example, by adjusting the protruding length from the placement surface 70 of the main body section 80, it is possible to adjust the timing at which the pressure applying surface 76 contacts the stack unit E and the timing at which the contact section 78 contacts the guide bar 66. In this manner, in the compression step, it is possible to adjust the relationship between the timing at which the stack units E are compressed and starts to move and the timing at which the guide bar 66 starts to move.

Next, by a fixing mechanism (not shown), the plurality of stack units E are kept compressed. Thus, in the state where the stack units E are positioned with respect to each other, it is possible to obtain the power generation cell stack body 12 to which the compression load is applied.

It should be noted that the magnitude of the compression load applied to the plurality of stack units E in the compression step can be determined arbitrarily as necessary. Further, the compression step may be performed multiple times while performing the releasing step between events of the compression step. In the releasing step, the drive mechanism 64 moves the pressure applying section 62 in a direction away from the placement frame 60 to reduce or eliminate the compression load. Thus, for example, it becomes possible to apply an aging treatment to the plurality of stack units E to make an initial creep progress.

As described above, the separator 28 according to the embodiment of the present invention is provided with the positioning section 58 where the stack units E are overlapped with together in the stacking direction in a manner that the stack units E are positioned with respect to each other. Therefore, for example, using the production apparatus 10, by moving the positioning section 58 along the guide bar 66, etc., while stacking the plurality of stack units E on the placement frame 60, it is possible to overlap the positioning sections 58 together in the stacking direction. In this manner, in the state where the plurality of stack units E are positioned with respect to each other, it is possible to stack the plurality of stack units E together easily.

Further, the marginal portion of the positioning section 58 has the bent surface 118 formed by bending the separator 28. The bent surface 118 of this type has a smooth shape having reduced surface roughness in comparison with a cutting surface (unbent surface) formed by, for example, cutting or machining which produces burrs and protrusions easily. For this reason, the frictional force generated between the positioning section 58 and the guide bar 66 when the positioning section 58 having the bent surface 118 in its marginal portion moves along the guide bar 66 is smaller than the frictional force when the positioning section (not shown) having the above cutting surface in its marginal portion moves along the guide bar 66. As a result, it is possible to suppress deformation of the separator 28.

Thus, in the separator 28 and the fuel cell stack 16 including the separator 28 according to the embodiment of the present invention, it is possible to position the stack units E with respect to each other easily with a high degree of accuracy. Further, in the fuel cell stack 16, it is possible to suppress deformation of the separator 28.

Further, in the embodiment of the present invention, when the stacked plurality of stack units E are compressed between the placement frame 60 and the pressure applying section 62, the guide bar 66 moves along the positioning section 58 to maintain the positions of the stack units E relative to each other. Therefore, while effectively suppressing positional displacement of the stack units E relative to each other, it is possible to compress the plurality of stack units E in the stacking direction. As described above, in the state where the positioning section 58 follows the guide bar 66, when the compression force is applied to the plurality of stack units E, the bending stress is generated easily in an area around the positioning section 58, due to friction, etc. generated between the positioning section 58 and the guide bar 66.

Also in this case, in the separator 28 according to the embodiment of the present invention, since the bent surface 118 is provided in the marginal portion of the positioning section 58, it is possible to reduce the frictional force generated between the positioning section 58 and the guide bar 66. Thus, it is possible to effectively suppress deformation of the area around the positioning section 58. That is, while suppressing the positional displacement of the stack units E and deformation of the separator 28, by applying the compression load to the plurality of stack units E, it is possible to obtain the power generation cell stack body 12.

The separator 28 for the fuel cell according to the embodiment of the present invention is a joint body of the first bipolar plate 46 and the second bipolar plate 48 that are stacked together. The bent surface 118 is formed by at least one of the first bipolar plate 46 and the second bipolar plate 48 to cover the other of the first bipolar plate 46 and the second bipolar plate 48. Specifically, the first part 46c of the first bipolar plate 46 is bent to cover the second part 48c of the second bipolar plate 48.

In this case, even when the separator 28 is the joint body of the first bipolar plate 46 and the second bipolar plate 48, with the simple structure where the first part 46c of the first bipolar plate 46 is bent, it is possible to provide the bent surface 118 for the positioning section 58. It should be noted that, though not shown, the second part 48c of the second bipolar plate 48 may protrude inward of the positioning section 58 (outward of the separator 28) from the end surface of the first part 46c of the first bipolar plate 46. In this case, the second part 48c is bent to cover the end surface of the first part 46c and the area adjacent to the end surface to form the bent surface 118.

In the separator 28 for the fuel cell according to the embodiment of the present invention, the positioning section 58 is in the form of a groove where part of the outer marginal portion 28a of the separator 28 is cut out from the outside to the inside of the separator 28. In this case, it is possible to provide the positioning section 58 for the separator 28 easily. Further, though the positioning section 58 is provided, it is possible to avoid increase in the outer size of the separator 28. Further, with the simple structure where the guide bar 66 in the form of a rod is inserted into the positioning section 58 in the form of a groove, it is possible to position the plurality of stack units E with respect to each other easily.

It should be noted that the positioning section 58 may be a protrusion protruding from the outer marginal portion 28a of the separator 28, toward the outside in the separator surface direction. In this case, it is adequate that the bent surface 118 is provided in the marginal portion of the protrusion. Further, it is adequate that the guide bar 66 has a groove (not shown) extending in the stacking direction. In the state where the positioning section 58 is inserted into the groove, by stacking the stack units E on the placement surface 70, it is possible to guide the stack units E to the stack position. Further, though not shown, the positioning section 58 may be a through hole penetrating through the separator 28 in the stacking direction.

In the separator 28 for the fuel cell according to the embodiment of the present invention, the positioning section 58 may be provided with the bent surface 118 for at least in one of the pair of sides (second sides 112) which are spaced from each other in the groove width direction. The end of the second side 112 of the positioning section 58 in the direction in which the second side 112 extends is continuous with the outer marginal portion 28a of the separator 28. The second side 112 tends to be deformed easily in comparison with the first side 110, due to the frictional force generated between the second side 112 and the guide bar 66. Therefore, by providing the bent surface 118 at least in the second side 112 to reduce the frictional force between the bent surface 118 and the guide bar 66, it is possible to effectively suppress deformation of the separator 28. In this case, it is possible to simplify the step (process) of forming the bent surface 118.

However, in the separator 28, the bent surface 118 may be provided over the entire periphery of the positioning section 58. In this case, though not shown, the bent surface 118 may be provided in the first side 110 by crimping, etc. as in the case of the second side 112. By providing the bent surface 118 over the entire periphery of the positioning section 58, it is possible to effectively suppress deformation of the separator 28 to a greater extent.

Figure 10:
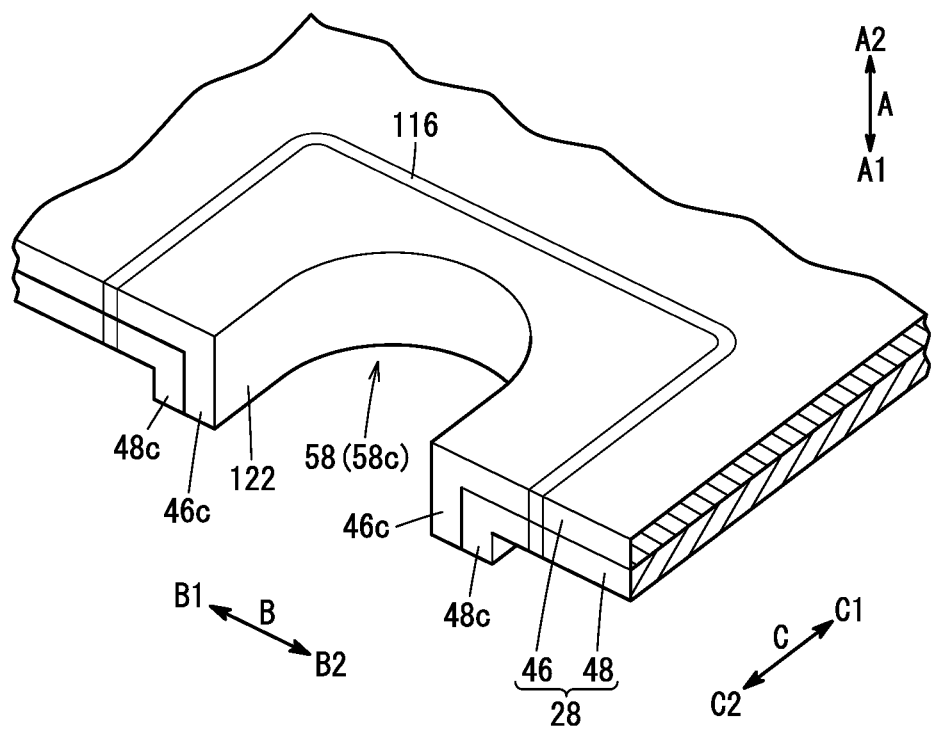
FIG. 10 is a perspective view showing a third positioning section having a bent surface according to a modified embodiment.

Further, as in the case of the separator 28 shown in FIG. 10, the first bipolar plate 46 and the second bipolar plate 48 may be bent in the same direction to provide a bent surface 122 in the form of a flange protruding in the direction indicted by the arrow A (in the embodiment of the present invention, on the arrow A1 side) in the marginal portion of the positioning section 58. Preferably, in this bent surface 122, a portion of the first bipolar plate 46 and a portion of the second bipolar plate 48 protruding in the direction indicated by the arrow A are welded together. It should be noted that, in the separator 28 shown in FIG. 10, preferably, for example, a cutout (not shown) may be provided in the marginal portion of the positioning section 58 for easy processing of the bent surface 122, and the positioning section 58 may be formed in a curved shape.

Further, though not shown, the bent surface may be provided in the marginal portion of the positioning section 58 by bending the first bipolar plate 46 and the second bipolar plate 48 in directions opposite to each other.

In the separator 28 for the fuel cell according to the embodiment of the present invention, the separator 28 has a rectangular shape including the pair of long sides which are spaced from each other, and the pair of short sides which are spaced from each other. The positioning section 58 includes the first positioning section 58a provided for one of the pair of short sides of the separator 28, and the second positioning section 58b provided for the other of the short sides of the separator 28, and the third positioning section 58c provided for one of the pair of long sides of the separator 28.

Further, in the separator 28 for the fuel cell according to the above embodiment, the first positioning section 58a and the second positioning section 58b are disposed at diagonal positions of the separator 28, and the third positioning section 58c is disposed at the center of the long side.

By providing the positioning section 58 as described above, it is possible to effectively suppress positional displacement between the stack units E. Further, it is possible to effectively suppress deformation of the separator 28.

It should be noted that the present invention is not limited to the above described embodiment. Various structures can be adopted without departing from the gist of the present invention.

For example, the separator 28 may not be formed by joining the first bipolar plate 46 and the second bipolar plate 48 together. The separator 28 may be formed by one metal plate (bipolar plate). Even in the case of a separator formed by one metal plate (not shown), by providing the positioning section 58 having the bent surfaces 118, 122, it is possible to easily position the stack units E with respect to each other. Further, it is possible to suppress deformation of the separator.

What is claimed is:

1. A separator for a fuel cell, the separator being configured to be overlapped with a membrane electrode assembly to form a stack unit, the membrane electrode assembly comprising an electrolyte membrane and electrodes provided on both surfaces of the electrolyte membrane, a plurality of stack units being stacked together in a stacking direction to form a power generation cell stack body, wherein the separator is provided with a positioning section to be overlapped in the stacking direction in a manner that the stack units are positioned with respect to each other; and a marginal portion of the positioning section has bent surfaces formed by bending the separator in the stacking direction, wherein the positioning section is in a form of a groove where part of an outer marginal portion of the separator is cut out from an outside to an inside of the separator, and the positioning section is provided with the bent surfaces in a pair of sides spaced from each other in a groove width direction, wherein the separator has a quadrangular shape including one pair of opposing first sides and another pair of opposing second sides, the positioning section includes a first positioning section formed in one of the first sides and a third positioning section formed in one of the second sides.

2. The separator for the fuel cell according to claim 1, wherein the separator comprises a joint body of a first bipolar plate and a second bipolar plate that are stacked together; and the bent surfaces are formed by bending at least one of the first bipolar plate and the second bipolar plate to cover the other of the first bipolar plate and the second bipolar plate.

3. The separator for the fuel cell according to claim 2, wherein the positioning section is provided with protruding pieces of the at least one of the first bipolar plate and the second bipolar plate, the protruding pieces protruding in the groove width direction from the pair of sides of the marginal portion of the positioning section, and the protruding pieces cover the other of the first bipolar plate and the second bipolar plate to form the bend surfaces.

4. The separator for the fuel cell according to claim 2, further comprising:

a welding section for welding the first bipolar plate and the second bipolar plate together, wherein the positioning section includes a first side positioned inward of the outer marginal portion of the separator between the pair of sides spaced from each other in the groove width direction, the first side extending along the outer marginal portion of the separator, and the welding section is in a form of a line extending along the first side and the pair of sides of the positioning section, the welding section being positioned on an inner side of the first side and the pair of sides of the positioning section.

5. The separator for the fuel cell according to claim 1, wherein the bent surfaces are provided over an entire periphery of the positioning section.

6. The separator for the fuel cell according to claim 1, wherein the quadrangular shape of the separator is a rectangular shape including a pair of long sides spaced from each other and a pair of short sides spaced from each other; and the first positioning section is provided for one of the pair of short sides of the separator, a second positioning section is provided for another of the pair of short sides of the separator, and the third positioning section provided for one of the pair of long sides of the separator.

7. The separator for the fuel cell according to claim 6, wherein the first positioning section and the second positioning section are disposed at diagonal positions of the separator; and the third positioning section is provided at a central portion of the long side.

8. A fuel cell stack including a power generation cell stack body formed of a plurality of cell units stacked together in a stacking direction, the cell units each being formed of a membrane electrode assembly and a separator overlapped together, the membrane electrode assembly comprising an electrolyte membrane and electrodes provided on both surfaces of the electrolyte membrane, wherein the separator is provided with a positioning section to be overlapped in the stacking direction in a manner that the stack units are positioned with respect to each other; and a marginal portion of the positioning section has a bent surface formed by bending the separator in the stacking direction, wherein the positioning section is in a form of a groove where part of an outer marginal portion of the separator is cut out from an outside to an inside of the separator, and the positioning section is provided with the bent surfaces in a pair of sides spaced from each other in a groove width direction, wherein the separator has a quadrangular shape including one pair of opposing first sides and another pair of opposing second sides, the positioning section includes a first positioning section formed in one of the first sides and a third positioning section formed in one of the second sides.

* * * * *